M. J. PHILBIN.
NOTE RECORD CARD SET.
APPLICATION FILED FEB. 1, 1915.

1,189,286.

Patented July 4, 1916.
2 SHEETS—SHEET 1.

FIG. 1.

| NOTE NUMBER | DISCOUNT REGISTER |
|---|---|
| 13930 | |

MAKER — DATE DUE _____ 191_
ENDORSEMENT OR COLLATERAL

DATE / TIME
MONTH | DAY | MONTHS | DAYS

AMOUNT | DISCOUNT | CREDIT LOANS | CREDIT DISCOUNT

THIS NOTE IS PAYABLE AT THIS BANK.

DISCOUNTED _____ 191_

FIG. 2.

NOTE NUMBER 13930

NOTE NOTICE
— FROM —
THE OLYPHANT BANK, OLYPHANT, PA.
THE FOLLOWING NOTE WILL BE DUE _____ 191_

MAKER — ENDORSEMENT OR COLLATERAL

DATE / TIME
MONTH | DAY | MONTHS | DAYS

AMOUNT | DISCOUNT

THIS NOTE IS PAYABLE AT THIS BANK

DISCOUNTED _____ 191_

FIG. 3.

NOTE NUMBER 13930 — DISCOUNT TICKLER

MAKER — DATE DUE _____ 191_
ENDORSEMENT OR COLLATERAL

DATE / TIME
MONTH | DAY | MONTHS | DAYS

AMOUNT | DISCOUNT | CREDIT LOANS | CREDIT DISCOUNT

THIS NOTE IS PAYABLE AT THIS BANK

DISCOUNTED _____ 191_

WITNESSES:
H. Hurst
H. E. Chase

INVENTOR
M. J. Philbin
BY Howard P. Denison
ATTORNEY.

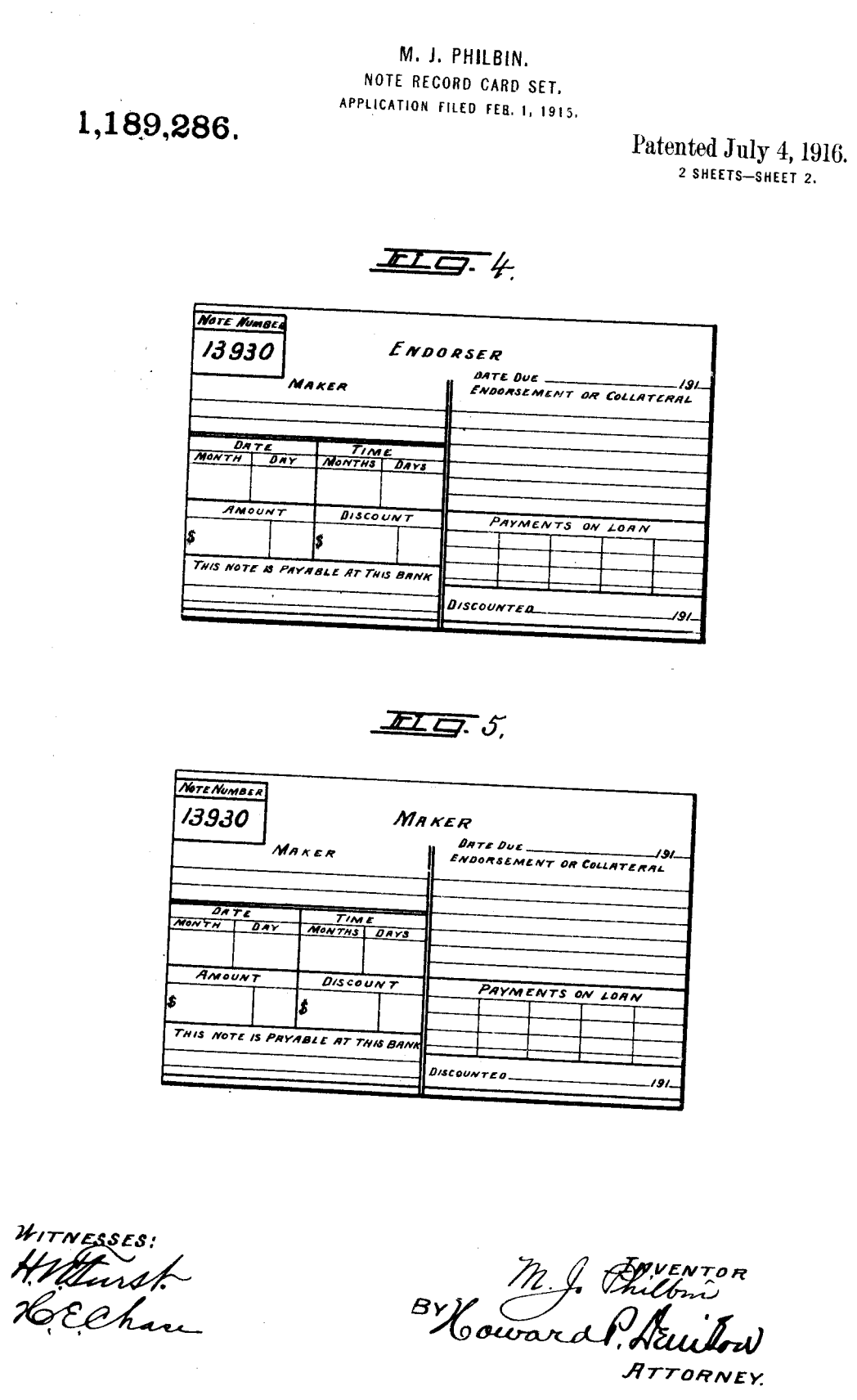

M. J. PHILBIN.
NOTE RECORD CARD SET.
APPLICATION FILED FEB. 1, 1915.

1,189,286.

Patented July 4, 1916.
2 SHEETS—SHEET 2.

UNITED STATES PATENT OFFICE.

MATTHEW J. PHILBIN, OF OLYPHANT, PENNSYLVANIA.

NOTE-RECORD-CARD SET.

1,189,286.  Specification of Letters Patent.  Patented July 4, 1916.

Application filed February 1, 1915. Serial No. 5,475.

*To all whom it may concern:*

Be it known that I, MATTHEW J. PHILBIN, a citizen of the United States, and resident of Olyphant, in the county of Lackawanna, in the State of Pennsylvania, have invented new and useful Improvements in Note-Record-Card Sets, of which the following, taken in connection with the accompanying drawings, is a full, clear, and exact description.

This invention relates to an improved note record card set for use in banks and other places where it is necessary or desirable to keep a record of all current notes, and information pertaining thereto, held by or passing through such bank or similar institution.

Under the present system, these records are usually kept in bound or loose-leaf ledgers, in which it is necessary to make successive entries in the "discount register", the "discount tickler", the record under "indorser" and another record under the "maker" of the note, after which a "note notice" is made out from the note and finally a record is made out to run through the work of the bank, thus necessitating six entries in order to record the information necessary for each note, which is obviously laborious, cumbersome and inconvenient as a reference.

The main object of my present invention is to provide a ready reference card index for bank notes in which all of the information or records of any bank note may be entered at one writing and the cards filed under their respective captions or headings to constitute a convenient and ready reference for subsequent use. In other words, I have sought to provide what might be termed a "liability card ledger" in which the cards of each set for a particular note bear the same number and record, but are filed under their proper headings and constitute a current record that is positively accurate without additional labor except as to the filing of the cards alphabetically.

In the drawings Figures 1, 2, 3, 4 and 5 are face views of a set of cards bearing the date or information for a single note designated by a serial number, in this instance 13930, printed in the upper left-hand corner under the caption note number.

The card shown in Fig. 1 under the heading "discount register" is a part of the original record of entry detached from a continuous sheet bearing a series of, in this instance 5, similar records under consecutive numbers which are adapted to be bound with similar sheets and used in the same manner as the bound book "discount register" is used. This card bears upon its face the heading "discount register" together with the "date due" and the "indorsement or collateral", and also the "note number". Upon one-half of the face of the card is recorded the "maker", "date, month and day", "time, months and days", "amount", "discount", and the bank at which the note is payable under the heading "This note is payable at this bank". On the opposite half of the face of the card is recorded the "date due", "indorsement or collateral", "credit loans", "credit discount", and the "date discounted".

The cards shown in Figs. 2, 3, 4 and 5, bear, respectively, the captions "note notice", "discount tickler", "indorser" and "maker", but otherwise bear the same information as recorded upon the card shown in Fig. 1, except that in Fig. 2 the "credit loans" and "credit discounts" are omitted and a blank space left for instructions to the "maker" or "indorser", the only difference in the cards shown in Figs. 4 and 5, aside from the captions or headings, being that the space occupied by "credit loans" and "credit discount" in the "discount register" card of Fig. 1 is substituted by "payments on loan".

The card shown in Fig. 2 is a notice to the maker of the note and is filed in a suitable drawer according to the maturity of the note. A week or ten days before maturity, this notice is sent to the maker of the note to afford ample time for its attention, the detail information being given on the notice to avoid any confusion as to which note is intended, in case the maker has more than one note discounted.

The card shown in Fig. 3 and designated as the "discount tickler" is filed according to the maturity of the note and on the due date is run through the work of the bank and gives to the note clerk all the necessary information without further labor.

The card shown in Fig. 4 and marked "indorser" is filed under the name of endorser in the liability file.

The card shown in Fig. 5 is a final record of the series and is filed in the liability file under the name of the maker.

It is now apparent that all the note record sheets bear the same number and have the same record, but are filed under their proper headings, thus constituting a liability ledger which is kept current and is positively accurate without additional labor, except as to the filing of the card records in alphabetical arrangement.

The saving of time by this system of cards is obvious since all entries are made with one writing, when the cards are superposed and separated by carbon sheets, it being noted that the empty spaces of each card lie directly over the other, while with the bound or loose-leaf ledgers now in common use, it is necessary to make the entries in the "discount register", "discount tickler", the record under "indorser", the record under the "maker" of the note, and afterward, the "note notice" and finally the record which is made out to run through the work of the bank, thus necessitating six entries as against the one entry necessary in applicant's system, and while I have shown ca specific relative arrangement of the various sub-headings under the heading of each card, it is evident that these sub-headings may be otherwise arranged without departing from the spirit of my invention, and therefore, I do not limit myself to the precise arrangement shown and described.

What I claim is:

1. A note record card set, having cards respectively designated as a "register" card, a "notice" card, a "tickler" card, an "indorser" card and a "maker" card, all of substantially the same size and adapted to be separably superposed one upon the other for the interposition of transfer medium, each card having spaces appropriately designated respectively as a "maker's" name space, a note "date" space, a "time" space and an "amount" space, said spaces being so arranged that like spaces will be in exact superposition when the cards are superposed one upon the other, whereby the matter impressed on the said spaces of the front card may be produced in the corresponding spaces of the other cards at one writing, the discount register and discount tickler cards provided with additional spaces appropriately designated for entry or credit loans and credit discounts, such spaces being in registration when the cards are superposed, whereby credit loan and credit discount matter may be produced at one writing upon the discount register and discount tickler cards when said cards are separated from the remaining cards.

2. A note record card set having cards respectively designated as a "register" card, a "notice" card, a "tickler" card, an "indorser" card and a "maker" card, all of substantially the same size and adapted to be separably superposed one upon the other for the interposition of transfer medium, each card having spaces appropriately designated respectively as a "maker's" name space, a note "date" space, a "time" space and an "amount" space, said spaces being so arranged that like spaces will be in exact superposition when the cards are superposed one upon the other, whereby the matter impressed on the said spaces of the front card may be produced in the corresponding spaces of the other cards at one writing, the discount register and discount tickler cards provided with additional spaces appropriately designated for entry of credit loans and credit discounts, such spaces being in registration when the cards are superposed, whereby credit loan and credit discount matter may be produced at one writing upon the discount register and discount tickler cards when said cards are separated from the remaining cards, and the indorser and maker cards provided with spaces appropriately designated for receiving indications of payments on the loan, said spaces being in registration when the cards are superposed so that matter relating to payments on the loan may be produced on said indorser and maker cards at one writing when said cards are separated from the remaining cards.

In witness whereof I have hereunto set my hand this 29th day of January, 1915.

MATTHEW J. PHILBIN.

Witnesses:
DAN G. JONES,
JAS. F. JORDAN.